United States Patent
Dadone

(10) Patent No.: US 12,005,829 B2
(45) Date of Patent: Jun. 11, 2024

(54) STOWABLE HARD WALLED PICKUP BED CAMPER

(71) Applicant: Marcelo Dadone, Miami, FL (US)

(72) Inventor: Marcelo Dadone, Miami, FL (US)

( * ) Notice: Subject to any disclaimer, the term of this patent is extended or adjusted under 35 U.S.C. 154(b) by 14 days.

(21) Appl. No.: 17/719,743

(22) Filed: Apr. 13, 2022

(65) Prior Publication Data

US 2022/0324371 A1 Oct. 13, 2022

Related U.S. Application Data

(60) Provisional application No. 63/174,441, filed on Apr. 13, 2021.

(51) Int. Cl.
*B60P 3/34* (2006.01)

(52) U.S. Cl.
CPC ...................................... *B60P 3/34* (2013.01)

(58) Field of Classification Search
CPC ...... B60P 3/32; B60P 3/34; B60P 3/38; B60P 3/39; B60J 7/1607; B60J 7/1621; B60J 7/141
USPC .............................. 296/164, 165, 100.02, 156
See application file for complete search history.

(56) References Cited

U.S. PATENT DOCUMENTS

| | | | |
|---|---|---|---|
| 3,367,347 A * | 2/1968 | Smith | B60J 7/102 135/88.13 |
| 3,582,129 A | 6/1971 | Frank | |
| 3,712,005 A * | 1/1973 | Eschbach | E04B 2/78 296/191 |
| 3,857,601 A * | 12/1974 | Robbins | B60J 7/106 296/10 |
| 4,768,824 A * | 9/1988 | Andonian | B60P 3/34 296/105 |
| 4,815,786 A * | 3/1989 | McRay | B60P 3/34 296/26.05 |
| 5,065,855 A * | 11/1991 | Nellums | F16D 23/0606 192/53.332 |
| 5,299,849 A * | 4/1994 | Cook | B60J 7/104 296/159 |
| 6,428,079 B1 | 8/2002 | Van Dyke | |
| 6,439,647 B1 * | 8/2002 | Baldwin | B60J 7/1657 296/165 |
| 6,799,784 B2 | 10/2004 | Rios | |

(Continued)

FOREIGN PATENT DOCUMENTS

AU 2006100802 A4 10/2006

*Primary Examiner* — Gregory A Blankenship
(74) *Attorney, Agent, or Firm* — Fleit Intellectual Property Law; Paul D. Bianco; Gary S. Winer

(57) ABSTRACT

A camper sized to fit atop a pickup truck bed includes: left and right side panels each formed of one or more substantially planar panels together sized to extend along a side of the pickup truck bed; a roof panel formed of one or more substantially planar panels together sized to extend between the left and right side panels and between the front and rear panels; a front panel formed of one or more substantially planar panels together sized to extend across a front side of the pickup truck bed and between the left and right side panels; and a rear panel formed of one or more substantially planar panels together sized to extend across the rear of the pickup truck bed between the left and right side panels. The panels are stackable one flat atop the other and stowable within the truck bed when the camper is disassembled.

18 Claims, 5 Drawing Sheets

(56) References Cited

U.S. PATENT DOCUMENTS

| | | | |
|---|---|---|---|
| 7,243,965 B2 | | 7/2007 | King et al. |
| D610,067 S | | 2/2010 | Frankham |
| 7,988,218 B1 | * | 8/2011 | Devine ................ B62D 33/044 |
| | | | 296/100.01 |
| 10,272,754 B2 | * | 4/2019 | Johnson .................... B60J 7/198 |
| 11,376,937 B2 | * | 7/2022 | Voss ........................... B60J 7/11 |
| D961,490 S | * | 8/2022 | Voss ............................. D12/404 |
| D961,491 S | * | 8/2022 | Voss ............................. D12/404 |
| D964,253 S | * | 9/2022 | Voss ............................. D12/404 |
| 11,440,387 B1 | * | 9/2022 | Younkins, Jr. ......... B60J 7/1621 |
| 11,623,830 B1 | * | 4/2023 | Hall ....................... B65G 67/20 |
| | | | 414/495 |
| 2008/0067830 A1 | * | 3/2008 | Frankham ................ B60J 7/106 |
| | | | 296/100.02 |
| 2017/0335561 A1 | * | 11/2017 | Wickramasekera ...... B60P 3/34 |
| 2018/0072214 A1 | * | 3/2018 | Stoetzl .................... B60J 7/024 |
| 2022/0281373 A1 | * | 9/2022 | Barnhart .................... B60P 3/34 |
| 2022/0324370 A1 | * | 10/2022 | King ......................... B60P 3/34 |
| 2022/0324371 A1 | * | 10/2022 | Dadone .................... B60P 3/34 |

\* cited by examiner

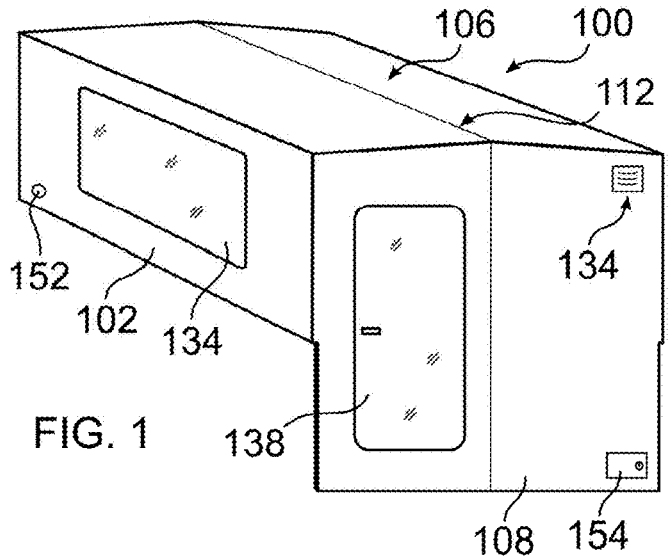
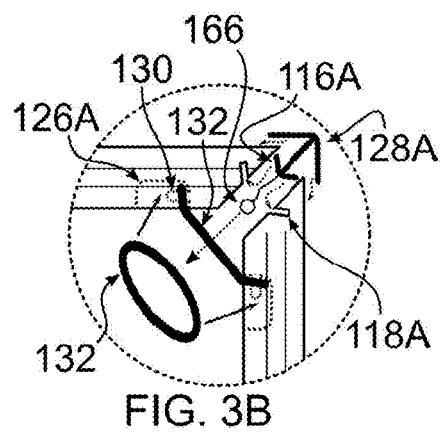
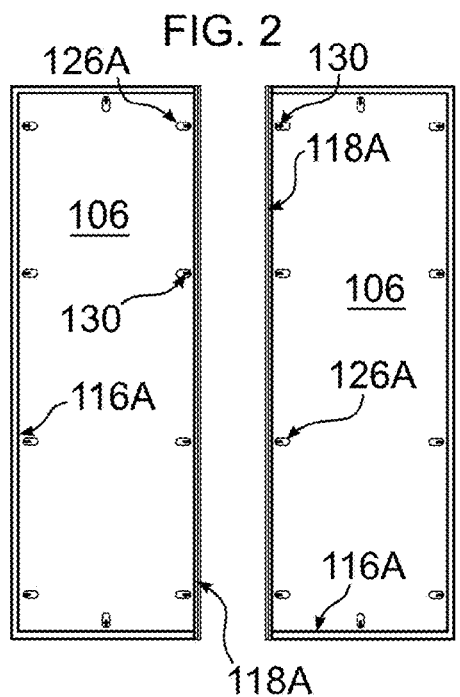
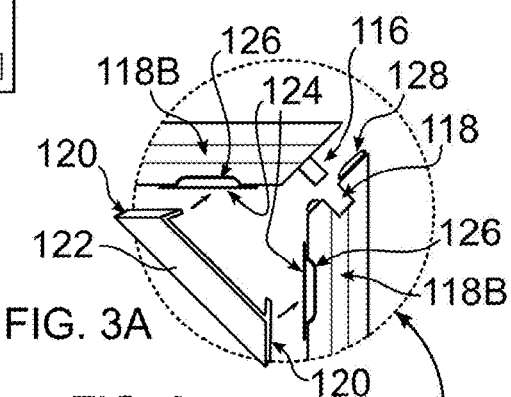
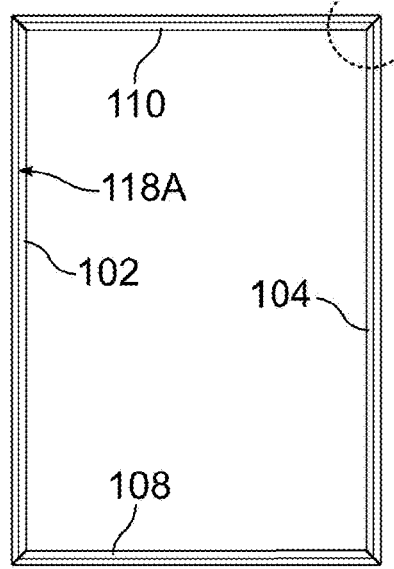
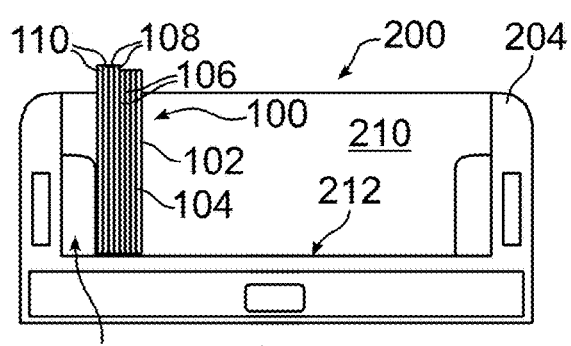
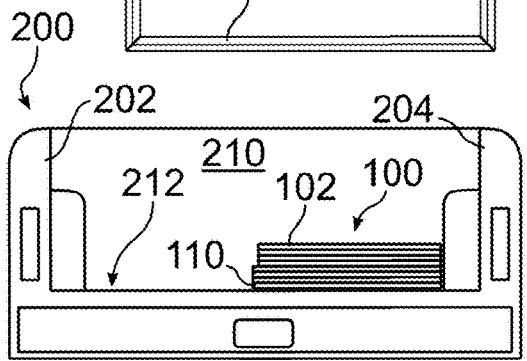

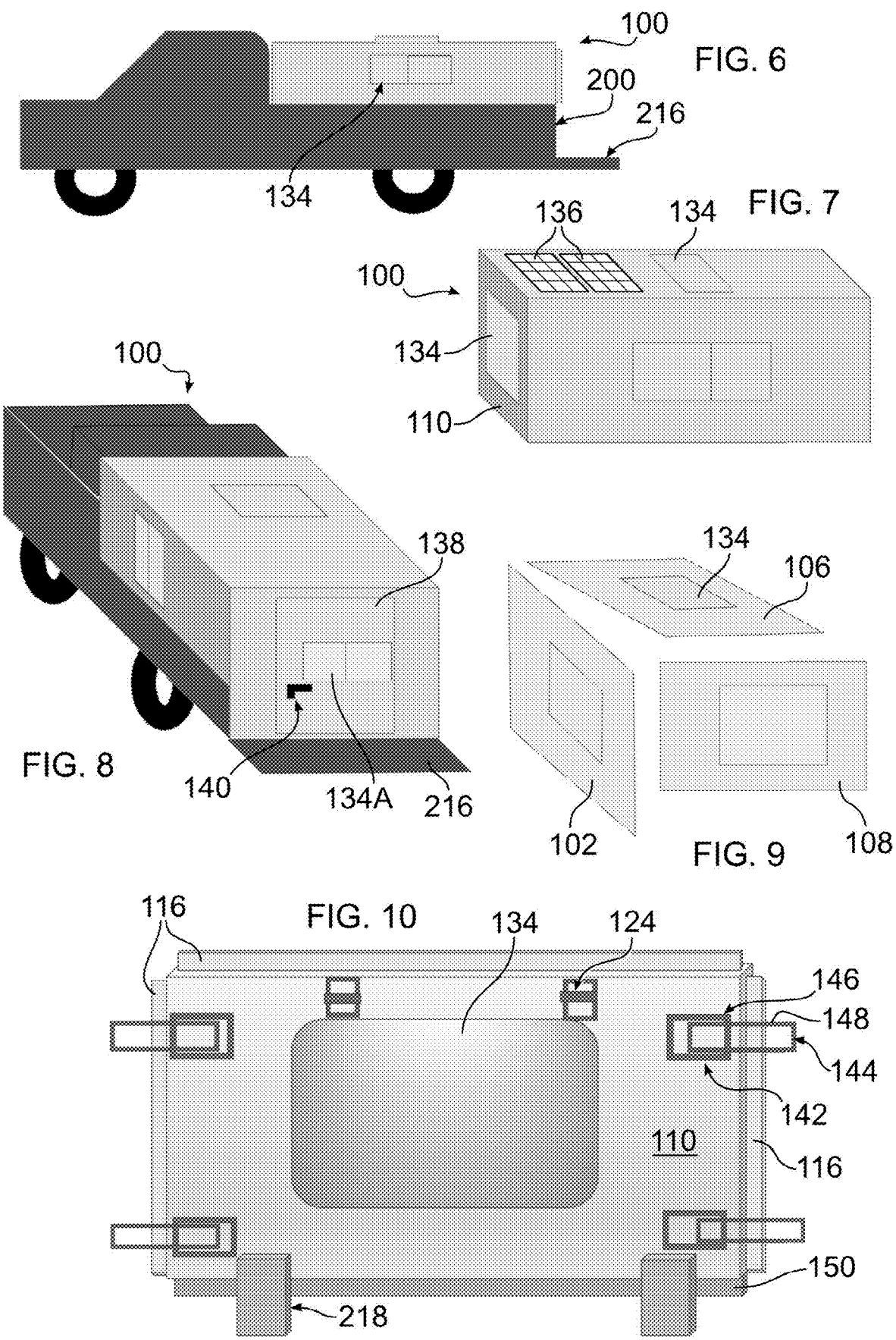

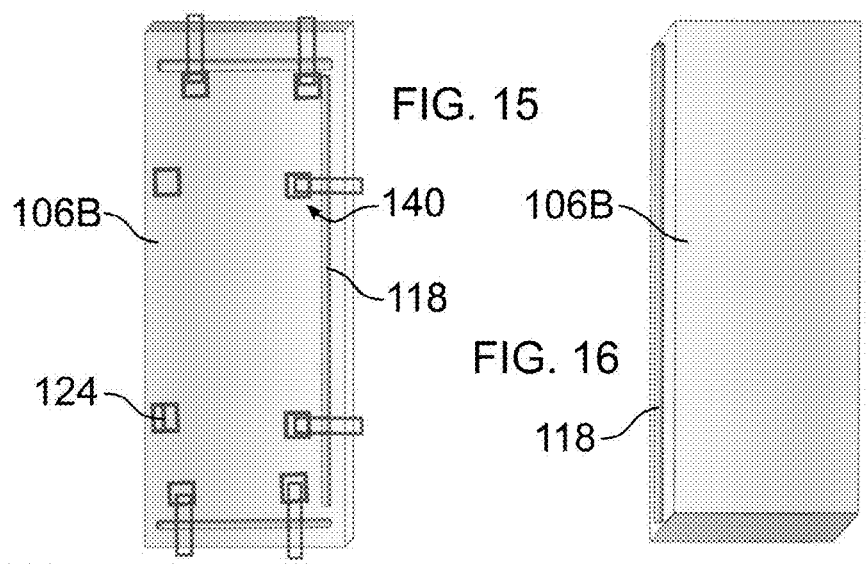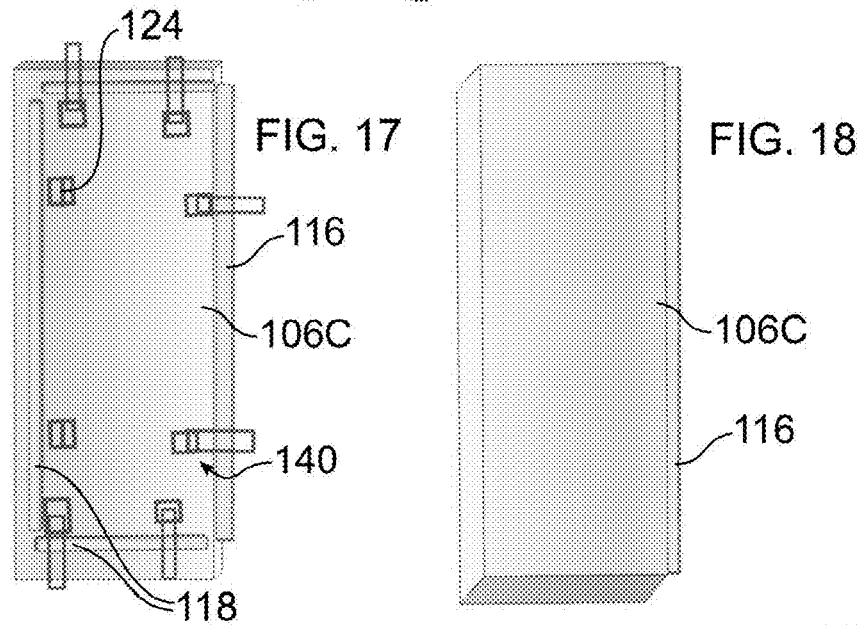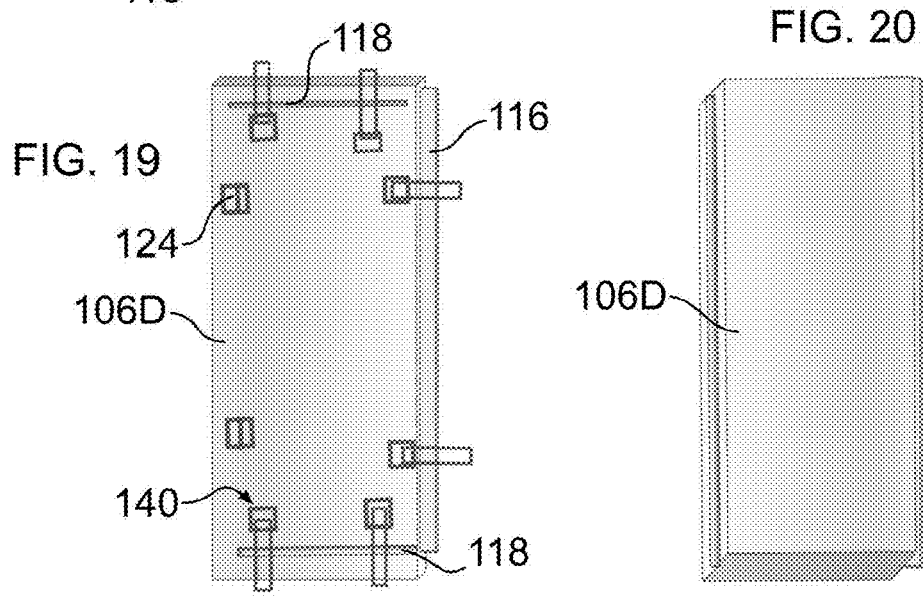

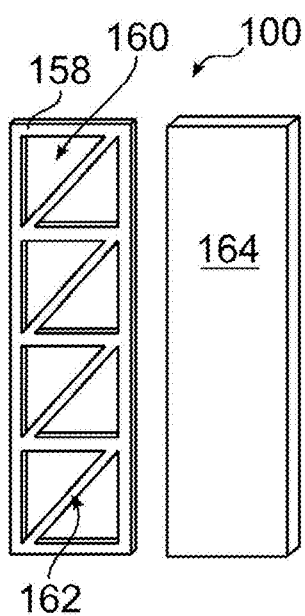
FIG. 21
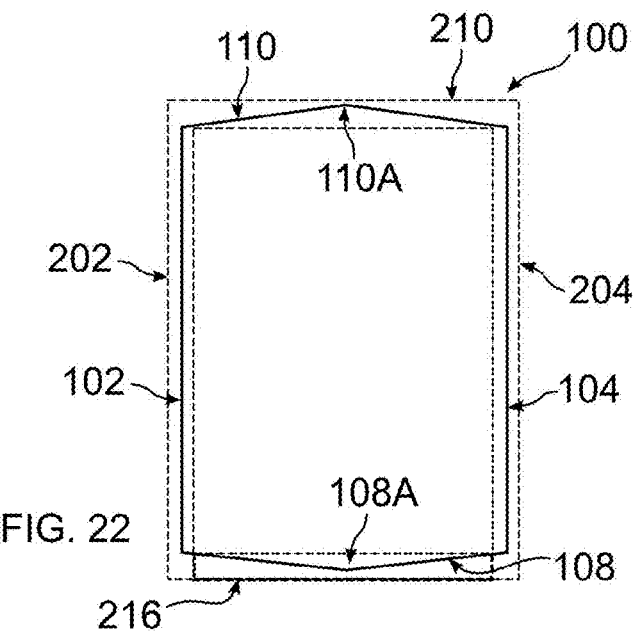
FIG. 22
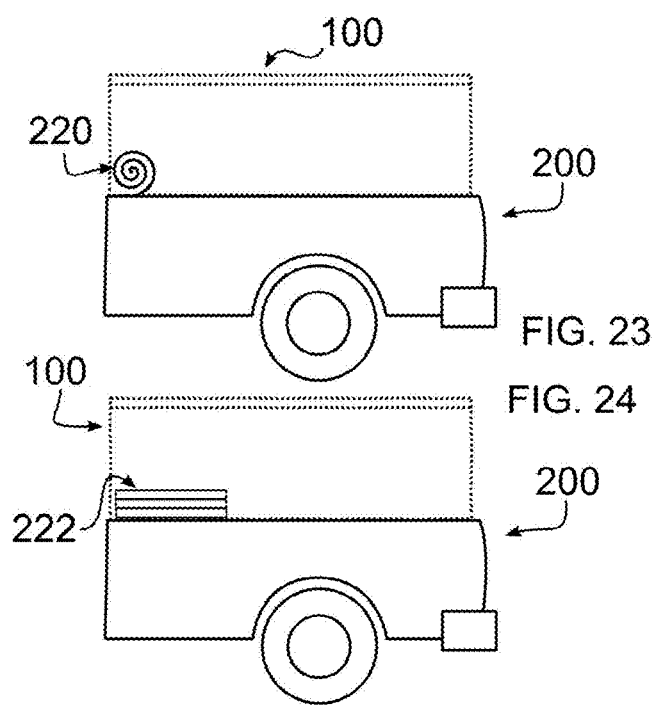
FIG. 23
FIG. 24
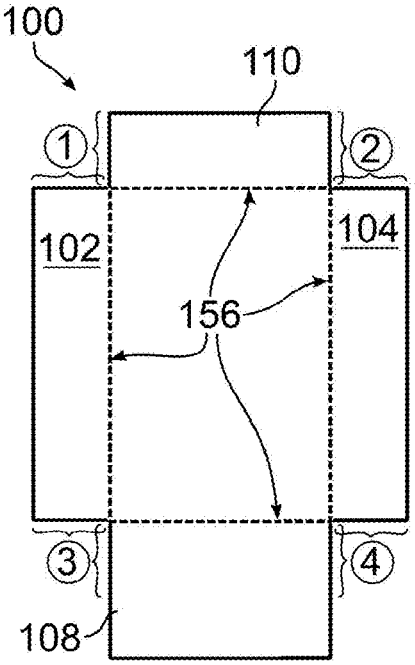
FIG. 25
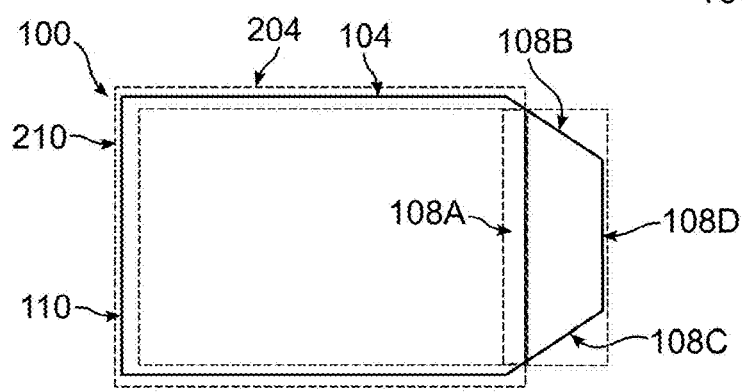
FIG. 26

STOWABLE HARD WALLED PICKUP BED CAMPER

FIELD OF THE DISCLOSURE

This disclosure relates to pickup bed campers, and more particularly to a hard walled field assembled camper which stows in a flat stack.

BACKGROUND

In 2019, over three million pickup trucks were sold to customers in the United States, as sales figures largest automobile segment in the United States in 2019. Typically, pickup sales represent 18% of all vehicles sold every year. There are 273.6 million of vehicles in the US and 20.57% of those are pickup trucks of various sizes, or approximately 56.3 million trucks.

Almost half of the US population ages 6 and over participated in an outdoor activity at least once in 2017. This continues three years of slight growth in outdoor participation prior to the pandemic, with substantially more participation post-pandemic.

Outdoor enthusiasts can choose from a variety of camping accommodations, including cots, hanging hammocks, tents, RV motor coaches, towable or pickup mounted RV campers, pickup bed tents, and pickup caps or toppers. Topper manufacturers include A.R.E., ATC/Astro, Century, Gemtop, Jason, Leer, Raider, Ranch, Snugtop, Unicover, and others.

SUMMARY

A camper sized to fit atop the periphery of a pickup truck bed comprises a left side panel formed of one or more substantially planar panels together sized to extend along a left side of the pickup truck bed and having a length not longer than a longitudinal length of the pickup truck bed; a right side panel formed of one or more substantially planar panels together sized to extend along a right side of the pickup truck bed and having a length not longer than a longitudinal length of the pickup truck bed; a roof panel formed of one or more substantially planar panels together sized to extend between the left and right side panels and between the front and rear panels and having a length not longer than a longitudinal length of the pickup truck bed; a front panel formed of one or more substantially planar panels together sized to extend across a front side of the pickup truck bed and between the left side panel and the right side panel; and a rear panel formed of one or more substantially planar panels together sized to extend across the rear of the pickup truck bed between the left side panel and the right side panel.

There is at least one opening to admit one of light and air. At least the left and right panels each includes a watertight mechanical seam releasably formable between each of the front and rear panels, with the mechanical seam not causing the left, right, front, or back panels not to be substantially planar when the mechanical seam is not formed. The left, right, front, back, and roof panels are stackable one flat atop the other and stowable within the pickup truck bed when the mechanical seam is not formed.

The camper can further include a tongue and groove connection formable at least between the left panel and each of the front and back panels and between the right panel and each of the front and back panels.

The camper can further include a plurality of connectors, at least one connector connectable between (a) the left panel and the front panel, (b) the left panel and the rear panel, (c) the right panel and the front panel, and (d) the right panel and the rear panel, to latch the left panel to the front and back panels, and to latch the right panel to the front and back panels. In one embodiment, the camper includes a plurality of connectors, with at least one connector connectable between (a) the left panel and the front panel, (b) the left panel and the rear panel, (c) the right panel and the front panel, and (d) the right panel and the rear panel, to latch the left panel to the front and back panels, and to latch the right panel to the front and back panels. In an exemplary embodiment, each connector is formed by one of a bar or post affixed to one connectable panel and clip or loop affixed to the other connectable panel, respectively.

The roof panel can form a peak defined by a living hinge. The front panel can be articulated by a living hinge. Each of the left, front, right, roof, and rear panels can be formed using one of fiberglass, glass reinforced plastic, and carbon fiber. At least one of the left, front, right, roof, and rear panels can be formed using a frame over which a material is fastened. The left, front, right, roof, and rear panels can be latched together to form the camper using spring loaded toggle latches. The rear panel can include an entryway opening.

BRIEF DESCRIPTION OF THE DRAWINGS

A more complete understanding of the disclosure, and the attendant advantages and features thereof, will be more readily understood by reference to the following detailed description when considered in conjunction with the accompanying drawings, in which:

FIG. 1 depicts a perspective view of a camper of the disclosure, assembled from flat panels which are stowable in a flat or stacked configuration in a pickup bed;

FIG. 2 depicts an underside of two interconnectable roof panels of the disclosure;

FIG. 3 depicts a top view of left (driver's side), right (passenger side), front, and back panels of the disclosure which have been interconnected at edges to form corners, the assembly forming a downwards facing open box;

FIG. 3A is a detail top view of a connected corner of FIG. 3, showing a clip and bar type connection, a tongue and groove interlocking, and seals;

FIG. 3B is a detailed top view of a connected corner of FIG. 3, showing a post and loop type connection, and an interlocking seal;

FIG. 4 depicts the camper of the disclosure that is disassembled, wherein all panels are stacked flat against each other and standing on edge surfaces, stowed within a pickup truck bed;

FIG. 5 depicts the camper of the disclosure that is disassembled, wherein all panels are stacked flat against each other and lying flat on planar face surfaces, stowed within a pickup truck bed;

FIG. 6 depicts the camper of the disclosure positioned atop a pickup truck bed;

FIG. 7 depicts an embodiment of the camper of the disclosure assembled and not placed atop a pickup truck bed;

FIG. 8 depicts a perspective rear view of a camper of the disclosure positioned atop a pickup truck bed;

FIG. 9 depicts a side, top, and rear panel of the disclosure that are separated;

FIG. 10 depicts a side or front panel including stake pocket rails which are insertable within stake pockets of a pickup truck bed;

FIG. 15 depicts an interior facing side of a front panel segment of a three segment roof panel of the disclosure;

FIG. 16 depicts an exterior facing side of the panel segment of FIG. 15;

FIG. 17 depicts an interior facing side of a rear panel segment of a three segment roof panel of the disclosure;

FIG. 18 depicts an exterior facing side of the panel segment of FIG. 17;

FIG. 19 depicts an interior facing side of a middle panel segment of a three segment roof panel of the disclosure;

FIG. 20 depicts an exterior facing side of the panel segment of FIG. 19;

FIG. 21 depicts an exploded view of a panel formed as a frame and a material covering;

FIG. 22 depicts a top view of left, front, right, and rear panels of a camper embodiment of the disclosure, together with a dashed outline of an upper surface of a pickup truck bed, illustrating a method of enabling left and right sides that are not longer than the pickup truck floor;

FIGS. 23 and 24 depict a camper of the disclosure mounted to enclose a roll top pickup truck bed cover and a folded pickup truck bed cover, respectively;

FIG. 25 depicts and embodiment of the disclosure requiring only 4 seams to be connected after assembly, wherein all panels are connected to the camper by a fold; and FIG. 26 depicts an embodiment with a three segment back panel which is extendable over a tailgate.

DETAILED DESCRIPTION

Figure 11:
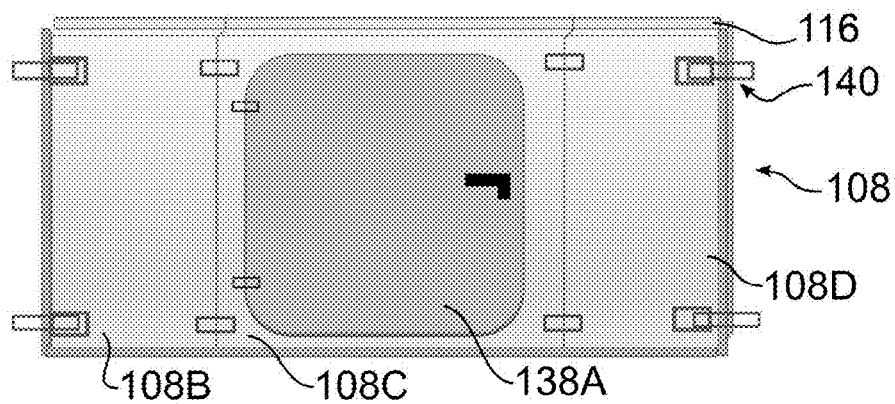
FIG. 11. depicts an interior facing side of a short form of a rear panel of the disclosure, that does not extend lower than the top of a tailgate of a pickup truck bed when installed.

This written description uses examples to disclose the embodiments, including the best mode, and also to enable those of ordinary skill in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities can be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

It can be advantageous to set forth definitions of certain words and phrases used throughout this patent document. The term "communicate," as well as derivatives thereof, encompasses both direct and indirect communication. The term "discreet," as well as derivatives thereof, references to the amount of skin exposed by a user of the garment, rather than the type of style of the garment. The terms "include" and "comprise," as well as derivatives thereof, mean inclusion without limitation. The term "or" is inclusive, meaning and/or. The phrase "associated with," as well as derivatives thereof, can mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items can be used, and only one item in the list can be needed. For example, "at least one of: A, B, and C" includes any of the following combinations: A; B; C; A and B; A and C; B and C; and A, B, and C.

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function.

Benefits, other advantages, and solutions to problems have been described above with regard to specific embodiments. However, the benefits, advantages, solutions to problems, and any feature(s) that can cause any benefit, advantage, or solution to occur or become more pronounced are not to be construed as a critical, required, sacrosanct or an essential feature of any or all the claims.

After reading the specification, skilled artisans will appreciate that certain features are, for clarity, described herein in the context of separate embodiments, can also be provided in combination in a single embodiment. Conversely, various features that are, for brevity, described in the context of a single embodiment, can also be provided separately or in any subcombination. Further, references to values stated in ranges include each and every value within that range.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. As used herein, the terms "substantial" and "substantially" means, when comparing various parts to one another, that the parts being compared are equal to or are so close enough in dimension that one skill in the art would consider the same. Substantial and substantially, as used herein, are not limited to a single dimension and specifically include a range of values for those parts being compared. The range of values, both above and below (e.g., "+/−" or greater/lesser or larger/smaller), includes a variance that one skilled in the art would know to be a reasonable tolerance for the parts mentioned.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

Headings are provided for the convenience of the reader, and are not intended to be limiting in any way.

As avid sportsmen and competitive "weekend athletes", the inventors frequently spend weekends in a campground. This contributed to their interest in a simple, improved, and inexpensive option for outdoor camping, without a requirement for sleeping in a fabric tent on the ground, and that can be combined with a pickup truck, which they were already using for their interests.

With reference to the Figures, the disclosure provides an easily assembled camper 100 structure, which is lightweight, durable, and watertight, and which provides excellent protection against harsh weather, all while being stowable in a very small space relative to prior art truck campers, enabling easy transport and storage. While shown with various window styles and other options in the figures, camper 100 can be customized in many other ways, without departing from the disclosure.

FIG. 1 depicts camper 100 which includes left (or driver's side in the U.S.) and right side panels 102, 104, one or more roof panels 106, one or more back panels 108, and one or more front panels 110 (collectively 'panels' of camper 100). In an embodiment, the roof of camper 100 is pitched, to encourage draining and prevent ponding during heavy rain or snow fall. As the roof of camper 100 is advantageously at least as large as the dimensions of the pickup bed, it is further advantageous if the roof can be folded to reduce storage bulk, particularly when roof panels 106 must be stored inside the bed of the truck when travelling. In one embodiment, roof panel 106 is a unitary panel divided by a living hinge, enabling roof panel 106 to be folded to have a smaller folded dimension. In another embodiment, as shown in FIG. 2, the roof can be formed as two roof panels 106 which are connected along a watertight seam. The living hinge or seam is designated as reference 112 in FIG. 1. When the roof is formed of two or more roof panels 106, the separated panels 106 can be joined along seam 112 as described with respect to the side wall seams in FIGS. 2 and 2A, below, or by another type of seam.

In FIG. 3, it may be seen that a perimeter of camper 100 is formed by front panel 110, right panel 104, back panel 108, and left panel 102. In the embodiment shown, viewed from the top with roof panels 106 removed, mutually contacting edges, as shown within a dotted circle, are provide with a mating beveled edge. This provides an advantage of a wider seam providing more space for a mechanical connection, as well as for a water intrusion seal. However, the panels can be provided with simple overlapping edges or other mating shape. A central peripheral seam line 118B designates either a groove or a projection which can be provided to mate with a corresponding groove or projection on an underside of roof panels 106. This joint can be of the type shown within the enlarged dotted circle of FIG. 3A, although the mating surfaces can be flat instead of beveled.

With further reference to the enlarged dotted circle of FIG. 3, it may be seen that a tongue or elongate projection 116 is provided on one mating surface, and a groove or elongate groove 118 is provided on the corresponding mating surface, whereby the two mating panels are held in mutual alignment. A dovetail type joint could also be used, however it would require one panel to be held aloft and lowered into connection with the mating panel, which may form a stronger connection, however it would require more effort to assemble. By using a simple projection and groove, the mating panels can be rested upon upper surfaces of the truck bed, and simply brought into mutual interconnection. However, to maintain this type of connection, it will be necessary to maintain an engagement of the mating panels.

More particularly, as shown in FIG. 3A, bent ends 120 of a clip 122 engage a bar 124 affixed to a surface of each mating panel, to latch and retain the mated panels in mutual engagement. To maintain a flat profile for the panels of camper 100, a bar groove 126 can be provided in a surface of each mating panel, whereby bent ends 120 reside below the surface of the panel after engagement, and when clips 122 are removed, the panels can stack flat against each other for stowage, as shown in FIGS. 4 and 5. Bar 124 can likewise be recessed within the panel to not extend above a surface of the panel to promote flatness. Herein, flat denotes a substantially planar shape with minimal projections, enabling the panels to lie in a stable fashion atop one another, thereby consuming a minimal amount of storage space.

FIG. 3B shows an alternative type of clip for latching and maintaining engagement of interconnected panels. More particularly, a post 130 is embedded within a panel and is exposed within a groove 126A. A resilient loop 132 can be stretched to pass over two posts to urge engaged panels together. As such, some flexibility is afforded engaged panels, whereby a strong gust of wind or a sudden impact can allow the panels to flex and not break. In an embodiment, an end of loop is affixed to one of the adjacent panels. Loop 132 or clip 122, or another manner of maintaining latched engagement, can be combined with alternative seal 128A, discussed below, for increased strength.

A projection 116 or groove 118 can be provided on an upper surface of the mating panels of FIGS. 3-3B. In FIG. 3A, this is depicted as groove 118B. A projection 116 can be provided on a lower surface of roof panel 106, and panel 106 and the front, back, or side panel 110, 108, 102/104 can be affixed as described with respect to FIGS. 3A and 3B.

A water blocking flexible seal 128 can be affixed to one or both sides of mating edges of engaged panels, extending along a length of mutual engagement. The panels are squeezed together as clip 122 or loop 130 is engaged, imparting pressure to seal 128 to form a watertight seal. Seal 128 can be affixed on opposite sides of the projection and groove joint, as shown in FIG. 3A. The shape and material chosen for seal 128 can be of any known type suitable for the connection type chosen. For example, seal 128 can be a natural rubber, leather, cotton or fabric, or an elastomer such as silicone, or an elastomeric polymer such as latex. Seal 128 can have a rounded profile as illustrated, or can have an L shape, U shape, or other flexible shape.

An alternative seal 128A, shown disengaged, is depicted in FIG. 3B. Opposed elongate projections or flukes 116A each engage an elongate groove 118A of an adjacent panel. As such, seal 128A can serve to retain adjacent panels in engagement alone, without the need for a clip 122 or other joining element. For additional strength to avoid pull-out, grooves 118A can be provided with a reverse angle, as shown. An elongate L shaped cap is connected to flukes 116A to span a gap between engaged panels, and to prevent water intrusion. While not illustrated, surfaces of seal 128A which contact a surface of a panel can be provided with ridges, curves, or other surfaces which can be deflected to form an improved watertight seal. Seal 128A can be provided with handle extensions (not shown), such as one or more loops or flanges, which can be grasped to pull seal 128A into position. The handle extensions can later be used to hang objects inside camper 100.

With further reference to FIG. 2, an underside of two adjoining roof panels 206 is depicted, together with grooves 118A, and posts 130 and grooves 126A of FIG. 3B. As a roof is formed, in an embodiment, it is particularly advantageous to use alternative seal 128A for the mutual seam between panels 106, to optimize water-tightness, and whereby the seam of FIG. 3A can be used for joints with other panels, as the latter may be easier to form. It should be understood, as illustrated in FIG. 1, that an angle that is formed along a mating surface of adjacent panels 106 maybe be smaller than the angle shown in FIGS. 3A and 3B, as the roof need only have a small pitch in order to adequately deflect water. This small pitch causes front and back panels 108 and 110 to be slightly longer than side and roof panels 102, 104, and 106, as can be seen in FIGS. 4-5.

Figure 12:
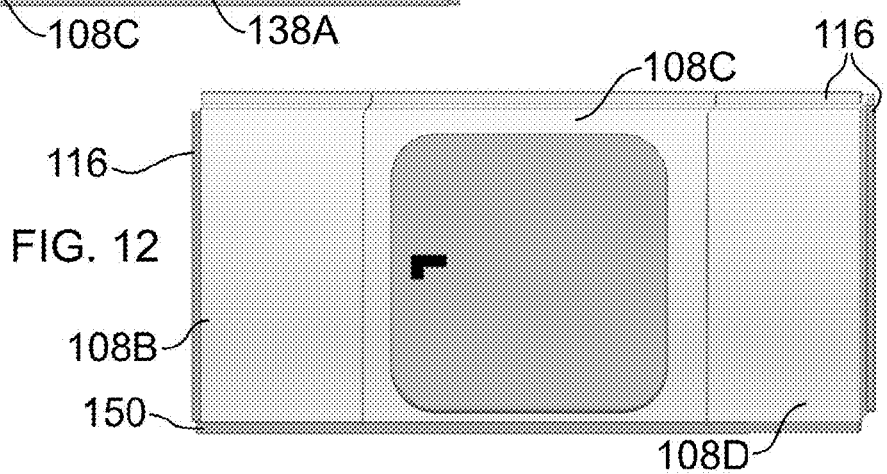
FIG. 12 depicts an exterior face of the rear panel of FIG. 11.

In an embodiment, camper 100 is shown and described to sit atop pickup bed 200, and particularly on top of bed side wall 202, 204, and front wall 210, and bed floor 212, or if back panel 108 is less tall, on top of tailgate 216 (FIGS. 11-12). If camper 100 is to be used with a flat-bed truck, all panels will rest upon the truck bed floor, and can be sized taller to produce a desired interior height.

With further reference to FIGS. 4 and 5, it may be seen that camper 100 can be stowed in a pickup bed 200 when traveling or stationary. As can be seen in FIG. 4, stacked panels 102, 104, 106, 108, and 110 can be stood on a side surface, resulting in the least impact on/use of the pickup bed floor 212. This further creates a sheltered area fore and aft of wheel well 214. If the height of panel sides 202, 204 is taller than the pickup bed sides 202, 204, this can cause the panels to extend above the pickup bed sides 202, 204, which can interfere with a roll-top or folding bed cover. Accordingly, it can be advantageous to provide all panels with a shortest dimension that is less than the height of the pickup bed sides 202, 204, if it is desired to stow the panels on their sides. It should be understood, however, that panels can have a vertical height sufficient to enable standing within camper 100. In an embodiment, panels of camper 100 can be vertically dimensioned to provide an assembled height sufficient to enable standing height for tall users.

Alternatively, as shown in FIG. 5, the panels can be positioned flat upon bed floor 212. In this configuration, gear can be stowed on top of the stacked panels, and the panels do not rise higher than the pickup bed sides 202, 204. In either the configuration of FIG. 4 or FIG. 5, it is advantageous if no panel has a longest dimension that is greater than a length of the pickup bed floor 212 with the tailgate closed.

For certain pickup bed styles, this can result in side panels 102, 104 being too short to extend completely from over the pickup bed front wall 210 all the way to extend over tailgate 216, or even up to tailgate 216. One option is to attach rails 218 which attach to and extend below the panels, as shown in FIG. 10, and which can be inserted into the existing stake pockets at the top of the pickup bed. In this manner, rails 218 can be positioned on an exterior face of any of panels 102, 104, 110 to thereby position the respective panel at an edge of the pickup bed side 202,204 or front 210, enabling panels 102, 104 to be no longer than the pickup bed floor 212.

Another option, as shown in FIG. 22, is to articulate panels 108, 110 with a living hinge, piano hinge, or other hinge 108A, 110A so that panels 108, 110 can extend inwards to meet side panels 102, 104, which are not longer than the bed 212 floor. This option solves the problem of limited side length where the stake pockets are covered, for example if there is a rolling or folding top attached to the top of the bed. In this configuration, camper 110 can attach to the pickup bed using Velcro, tie downs to anchors within the bed, or by tabs which insert under the rolling or folding top mounting flanges.

A still further option is to provide side panels 102, 104 at a length longer than the pickup bed floor 212, but to place at least these panels standing on their sides and extending angularly from opposite corners of the pickup bed.

A resilient wind and water seal 150 (FIG. 10) can be provided along lower edge surfaces of panels which rest upon portions of the pickup truck bed 212 and bed walls 202, 204, 210. This seal will be compressed and tightened by the weight of camper 100, and can further compressed, improving the seal, by one or more attachments between the pickup bed and camper 100. For example, tie points, similar to bar 124 or post 130 of FIGS. 3A-3B, or another type of attachment, can be provided within the panels, and can used to connect a tie-down strip or cord at one end, and the opposite end can be connected to a tie down point within the pickup bed.

Additionally or alternatively, bars 124 or posts 130 which are used to connect panels can simultaneously be used as tie points. In another embodiment, magnetically attractive strips can be placed along a lower edge of contacting panels, and along the contact surface of the pickup bed, which would also help in assembly.

As can be seen in FIGS. 23 and 24, camper 100 can be sized to surround a rolled or folded pickup bed cover 220, 222, respectively. There is ordinarily at least several inches between folded panels or a rolled up top and the front of the pickup bed, leaving adequate space for panels of camper 100, which can be very thin. By incorporating a locking bed cover, camper 100 can be safely stored inside the pickup bed 200 until deployment.

More particularly, panels of camper 100 can be formed of fiberglass, fiber reinforced plastic, carbon fiber, aluminum, steel, or a combination of these or other strong, durable, and waterproof materials. Depending upon the material selected, the disclosure can be carried out with a general panel thickness of about $1/16^{th}$ inch or less for the strongest materials, such as carbon fiber, or typically about $1/4^{th}$ to $1/3^{rd}$ inch for less strong but lower cost materials, such as fiberglass. Panels can be thinner or thicker than these dimensions, although it should be understood that strength tends to fall as panels become thinner, and panels become heavier and more costly as thickness is added. It is therefore a goal in selecting a thickness to consider and test performance at various thickness to find the optimal balance of strength, weight, and cost for particular prospective users' needs, and actual thickness is dependent upon such factors.

In an embodiment, panels of camper 100 can be formed from a wood, wood fiber, or wood pulp material, such as MASONITE, or other biodegradable material, with the understanding of the user that they can be expected to be assembled and used a limited number of times, but at least once, before they are discarded. Such embodiments can be constructed using an adhesive, wherein the adhesive is preapplied to appropriate locations on the panels with a peel-off protective layer that is removed by the user as the panels are mutually connected. Alternatively, weather resistant tape can be provided to tape the seams. After use, the tape can be slit to fold the panels, and additional tape can be applied later when it is desired to reassemble the camper 100. Such embodiments can be stowed in the truck for use in an emergency, such as a breakdown in extreme climates in remote locations. Of course, all other embodiments as described herein can likewise be stowed for emergency or limited use purposes only.

As an alternative to clip 122 or loop 132, a hook and loop type fabric fastener can be used to interconnect panels, and living hinges can be used more extensively, whether for readily biodegradable panels or for more durable panels. For example, with reference to FIG. 25, any or all panels can be formed from a single panel that is bent along water-tight hinges, such as living hinges or other type of folds 156 to define the distinct panels. If all panels 102-110 are formed in this manner, there are seams only at vertical edges (after folding) between the side panels 102, 104 and front panel 110, and side panels 102, 104 and rear panel 108, for a total of only 4 seams, as illustrated in FIG. 25 as encircled numbers 1-4. Alternatively, for example, only panels 102, 106, and 104 are interconnected in this manner, or only panels 110, 106, and 108, and the remaining panels are attached as described elsewhere herein. Folds 156 can be folded to 180 degrees, so that the camper 100 can be completely flattened and can be stowed below, between, or above cargo within the pickup bed 200.

In an embodiment, a folded or stacked camper 110 can be stowed attached to or just below an underside of a folding or roll top pickup bed cover, for example by being suspended below such cover. Camper 100 can be contained within a bag or other container, which can be cradled or suspended under the cover, for example using cables or bars (not shown) which extend between pickup bed side walls 202, 204, and/or front wall 210.

In a further embodiment, shown in FIG. 26, back panel 108 is formed of three rear panel segments 108B, 108C, and 108D, to extend rearwards over a lowered tailgate 216. The three panels segments 108B-D can be mutually detachable, or may be provided with a hinge, such as a piano or living hinge, whereby one of the panel segments 108B-D contains a doorway, for example rear panel 108D. By using three panels as depicted, interior space within camper 100 is increased. Roof panel 106 is shaped to correspond to and cover the extension thus formed.

In various embodiments, bracing or a frame 158 can be made from the same or a different material than flat panel portions, or frame 158 can be formed by thickened portions of the same material. When frame is formed separately, the frame and flat portions can be combined by any suitable means, including adhesive, co-molding, or fasteners such as rivets, screws, clips, or clamps.

As shown in FIG. 21, frame 158 can be formed as a separate molded or stamped part, for example of aluminum or other strong and lightweight material, in a unitary piece sized for a particular panel, including openings 160 and brace portions 162 to reduce weight. In an embodiment, frames 158 are mutually connected in a manner as described herein, such as clip 222/bar 124 or post 130/loop 132, or using fasteners such as pins forming a hinge, or screws, clips, or clamps. A fastener type is selected to avoid increasing a thickness of stamped parts 158, to reduce a stowed dimension of camper 100 as described elsewhere herein. Flat rigid panels 102-110 can be attached to the frame after the frame is assembled, for example using Velcro, or other releasable low thickness fastener, or can be attached prior to assembly of frames 158. A combined frame 158 and flat panel may increase the overall stowed thickness of camper 100, but can be easier to assemble and have greater assembled strength.

In a further embodiment, a soft cover 164, such as a contoured fabric or plastic cover, or a stretchable plastic wrap, is applied to frames 158 in place of a rigid panel, and is attached by adhesion, a draw string or elastomeric band, or clips, clamps or other fastener. Cover 164 can be applied before assembly of frame 158 in one embodiment, or after assembly in another embodiment. Openings 160 can be sized to prevent entry of anticipated potentially harmful animals. Such openings can be very small, for example forming a mesh, to prevent entry of smaller pests which may chew or tear through a fabric covering.

In FIG. 6, camper 100 is shown in position upon pickup bed 200. Windows, vents, or other openings, collectively referred to as openings 134, are positioned upon the panels to provide desired light, air, or passage of air or materials. In FIG. 7, an opening 134 forming a window admits light from the cab of the pickup, and a roof-top opening 134 can be provided to admit direct sunlight for light and/or warmth. Windows can be tinted to avoid glare, decrease interior heat, and/or to increase privacy. Flat flexible solar panels 136 can be affixed to roof panel 106 and stowed together with the panels, or can be removable. Wires and connectors can be affixed to, or embedded within the material of the panels, and connectors can be provided as needed to enable separation of panels. Solar panels 136 can provide power to one or more batteries of the pickup, or another battery or battery bank inside bed 200 and/or camper 100. Lights and/or fans, power outlets, or other electrical or electronic device can be provided together with camper 100, and an electrical connector 152 can be provided for connecting to shore power, a generator, or another source of external power. Such devices can be selected to have a flat profile, so that they can be affixed to the panels, for example embedded within a panel, or lying upon the surface a panel, promoting the smallest stacked profile of panels for stowage.

One or more access ports 154 (FIG. 1), can be provided upon a panel for passing through connections for sewer, gray water discharge, black water discharge, a fresh water connection, an electrical connection, or for access to interior storage from outside of camper 100. Access port 154 can have the form of a particular adapter or connector.

In an embodiment, a carry bag can be provided (not shown), sized to hold one or more panels of camper 100. Such bags can include handles, and can otherwise help to keep panels stacked and together, and to keep the panels clean until further use. In an embodiment, panels of camper 100 are painted to match the paint of a pickup. As such, the carry bags can be provided with a soft interior, and/or interior compartments which prevent scratching of painted panels. One or more loops or hooks can be provided on an exterior surface of the carry bag to enable hanging inside pickup bed 200 or upon a wall or shelf of a storage location.

As can be seen in FIG. 8, an embodiment of back panel 108 includes a doorway or other entry opening 138, which can include an opening 134A having a sliding portion to expose an insect screen, and can include a locking latch 140. An embodiment of front panel 110 is detailed in FIG. 10, and includes mechanical latches 142, in this embodiment a spring loaded toggle latch, which form an alternative to the attachment mechanisms shown in FIGS. 3A-B. Distal end 144 of latch 142 engages a catch, such as a bar 124, of an adjacent panel. A lever 146 provides leverage to pull bar 124 and one or more associated spring arms 148 into a latched position. Latch 142 is provided in a low profile configuration to reduce a stacked height of panels. In an embodiment, latch 142 lies within a channel or groove within its associated panel when not in use to reduce a stacked height of panels.

FIGS. 11 and 12 show an interior and exterior view, respectively, of a back panel 108 having a shorter height, whereby panel 108 does not extend down to floor 212 of bed 200, but instead extends down to a top surface of a closed tailgate 216. An entry opening 138 is provided as a window, if entry is made through a lowered tailgate 216, or can alternatively be used as a step-through or emergency exit. In another embodiment, not shown, entry opening 138 can be extended to the bottom of back panel 108, whereby an enlarged opening which extends to and includes an opening formed by an open tailgate is formed, facilitating entry and exit from camper 100. It may be seen that latches 140 are positioned upon the interior side of panel 108, although it should be understood that some or all latches of the disclosure can be provided upon an exterior surface. For example, a minimum number of latches can be provided upon an exterior surface to facilitate assembly, and remaining latches can be provided interiorly for security.

In the embodiment of FIGS. 11 and 12, back panel 108 is formed of three interconnected panels 108B-D. In one embodiment, these three panels are mutually affixed during manufacture, enabling the manufacture of back panels 108 with differing components, for example a portal door 138 as shown, or an extended door as described above, or no door. In another embodiment, the three panels 108B-D are mutually connected by a living hinge or other permanent hinge, so that back panel 108 can be folded to form a reduced profile. In a still further embodiment, panels 108B-D are releaseably mutually affixed by any known seam or attachment method, including any of the attachment mechanisms described herein.

Figure 13:
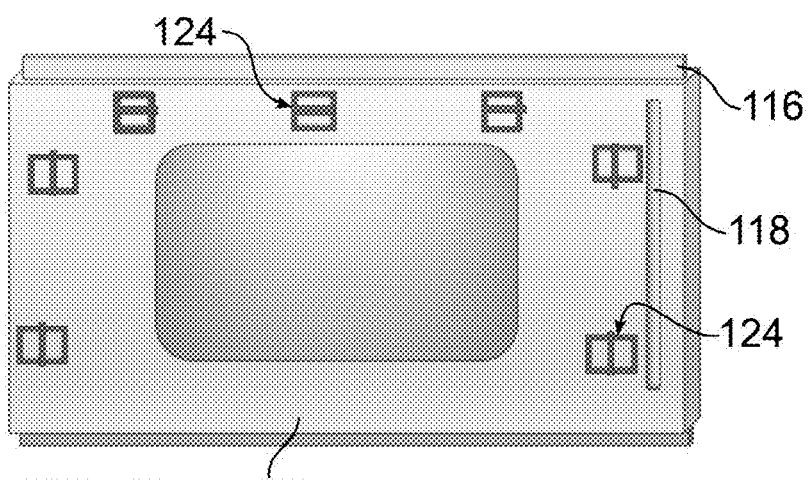
FIGS. 13 and 14 depict interior faces of left and right side panels, respectively, of an embodiment of the disclosure.
Figure 14:
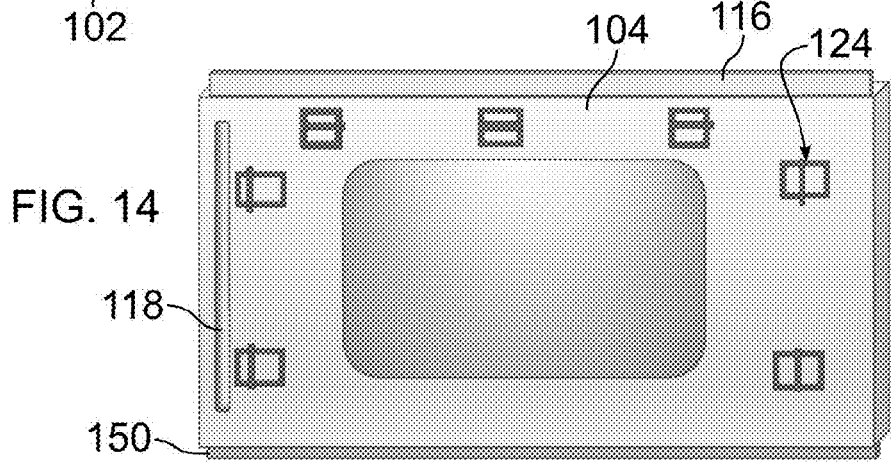

FIGS. 13 and 14 depict interior views of side panels 102 and 104, respectively. The panels are include elongate groove 118 into which elongate projection 116 of an adjacent panel, in this instance front panel 110, are inserted. As can be seen in FIGS. 13 and 14, groove 118 is intended to mate with a projection 116 extending from a flat end of an adjacent panel, and further, projection 116 can be offset from a centerline of a panel end surface, in this case, interiorly, leaving a broader space for a seal.

FIGS. 15-20 illustrate a roof composed of a front roof panel 106B, a mid roof panel 106C, and a back roof panel 106D, whereby a longest dimension of the panels lies transverse to a direction of travel of the vehicle. FIGS. 15, 17, and 19 depict an interior side of panels 106B, 106C, and 106D, respectively, wherein grooves 118 are each positioned to mate with one or more projections 116 of front panel 110, side panel 102, 104, or rear panel 110. Latches 140 are each positioned to latch to a bar 124 of an adjacent panel. FIGS. 16, 18, and 20 depict an exterior side of panels 106B, 106C, and 106D, respectively.

As such, the disclosure provides a low cost camper that can be stored in a small space when not in use, and which does not present wind drag when driving, while providing greater protection from the elements and wildlife than a conventional tent, all while being easy to remove from the vehicle. Camper 100 does interfere with normal use of the pickup bed when stowed in a garage, basement, or other storage space, and only a minimal reduction in space when stored within the pickup bed. In addition, camper 100 can be quickly assembled in place by a single person, typically in less than 10 minutes.

Camper 100 is provides sufficient ground clearance to avoid a risk of flooding, and intrusion by crawling insects and other animals. All panels can be provided with insulation to provide temperature stabilization inside the camper. Further camper 100 provides similar strength to a high quality prior art pickup bed cap or 'topper', while being easily removed by one person, and stowable inside the bed while leaving most of the bed available for cargo. Constructed of lightweight fiberglass or reinforced plastic, camper 100 can typically weigh about 80 pounds for a 6 foot bed, although lighter materials such as carbon fiber, or heavier materials such as wood, can lower or increase weight, respectively.

Camper 100 is less expensive than buying and owning a trailer, camper, or other RV, since it does not require a license plate, insurance, and regular servicing, or significant maintenance, repair, or storage space. It can easily be painted to match a vehicle, or be provided with custom graphics, particularly as the panels are flat, which facilitates application of a graphics 'wrap'.

Because camper 100 can be stacked in a minimal space, it is easily transported simultaneously with other cargo, such as kayaks, mountain bikes, dirt bikes, ATV, UTV, fishing and camping gear, a small boat, an inflatable craft, skis, tools, provisions, or other supplies. Panels of camper 100 can be fabricated to be sufficiently strong such that they may be arranged in a spread out fashion upon the pickup bed floor 212, and a vehicle or other large object can then be loaded on top of the panels. At a campsite, the vehicle can be unloaded, and camper 100 can be assembled. Later, if desired, the vehicle can be loaded inside camper 100, or it can be secured outdoors.

Camper 100 can be constructed to be sufficiently strong to be deployed while driving, however this would increase weight substantially, and would introduce drag which reduces mileage. As a compact stowable structure, camper 100 provides the additional benefit of saving fuel, as it introduces no wind drag when stowed during transport.

In an embodiment, panels can be replaced with mating panels which have different options or construction. For example, a replacement panel may be chosen which includes a molded-in fan, or attached or integrated solar panels, or an access opening. In this manner, as additional features are desired, camper 100 can be easily modified by a user. Further, if a user's pickup is changed for a different model, only those panels which need to be a different size are required to be changed, for example only longer or shorter side panels 102, 104 and roof panels 106.

All references cited herein are expressly incorporated by reference in their entirety. There are many different features of the present disclosure and it is contemplated that these features may be used together or separately. Unless mention was made above to the contrary, it should be noted that all of the accompanying drawings are not to scale. Thus, the disclosure should not be limited to any particular combination of features or to a particular application of the disclosure. Further, it should be understood that variations and modifications within scope of the disclosure might occur to those skilled in the art to which the disclosure pertains. Accordingly, all expedient modifications readily attainable by one versed in the art from the disclosure set forth herein that are within the scope of the present disclosure are to be included as further embodiments of the present disclosure.

List of Reference Numerals:

100 camper
102 left panel
104 right panel
106 roof panel
108, 108A-D back panel
110, 110A front panel
112 roof hinge
114 seam line -continued List of Reference Numerals:

116, 116A elongate projection
118, 118A, 118B elongate groove
120 clip ends
122 clip
124 bar
126, 126A bar groove
128, 128A seal
130 post
132 resilient loop
134 panel opening
134A sliding panel opening
136 solar panel
138 entry opening
140 door latch
142 mechanical latch
144 latch distal end
146 latch lever
148 latch spring arm
150 seal
152 electrical connector
154 access port
156 fold
158 frame
160 frame opening
162 frame brace
164 frame cover
166 seal pull loop
200 pickup bed
202 left pickup bed wall
204 right pickup bed wall
208 back
210 front pickup bed wall
212 pickup bed floor
216 pickup tailgate
218 stake pocket rail
220 pickup roll top
222 pickup folding top

What is claimed is:

1. A camper sized to fit atop a periphery of a pickup truck bed, the camper comprising:
a left side panel formed of one or more substantially planar panels together sized to extend along a left side of the pickup truck bed and having a length not longer than a longitudinal length of the pickup truck bed;
a right side panel formed of one or more substantially planar panels together sized to extend along a right side of the pickup truck bed and having a length not longer than the longitudinal length of the pickup truck bed;
a roof panel formed of one or more substantially planar panels together sized to extend between the left and right side panels and between the front and rear panels and having a length not longer than the longitudinal length of the pickup truck bed;
a front panel formed of one or more substantially planar panels together sized to extend across a front side of the pickup truck bed and between the left side panel and the right side panel;
a rear panel formed of one or more substantially planar panels together sized to extend across the rear of the pickup truck bed between the left side panel and the right side panel;
at least one opening to admit one of light and air;
at least the left and right panels each including a watertight mechanical seam releasably formable between each of the front and rear panels, the mechanical seam not causing the left, right, front, or back panels not to be substantially planar when the mechanical seam is not formed;
whereby the left, right, front, back, and roof panels are stackable one flat atop the other and stowable within the pickup truck bed when the mechanical seam is not formed;
wherein the roof panel forms a peak defined by a living hinge.

2. The camper of claim 1, further including a tongue and groove connection formable at least between the left panel and each of the front and back panels and between the right panel and each of the front and back panels.

3. The camper of claim 1, further including a plurality of connectors, at least one of the plurality of connectors connectable between the left panel and the front panel, at least one of the plurality of connectors connectable between the left panel and the rear panel, at least one of the plurality of connectors connectable between the right panel and the front panel, and at least one of the plurality of connectors connectable between the right panel and the rear panel, to latch the left panel to the front and back panels, and to latch the right panel to the front and back panels.

4. The camper of claim 2, further including a plurality of connectors, at least one of the plurality of connectors connectable between the left panel and the front panel, at least one of the plurality of connectors connectable between the left panel and the rear panel, at least one of the plurality of connectors connectable between the right panel and the front panel, and at least one of the plurality of connectors connectable between the right panel and the rear panel, to latch the left panel to the front and back panels, and to latch the right panel to the front and back panels.

5. The camper of claim 1, each of the left, front, right, roof, and rear panels formed using one of fiberglass, glass reinforced plastic, and carbon fiber.

6. The camper of claim 1, at least one of the left, front, right, roof, and rear panels formed using a frame over which a material is fastened.

7. The camper of claim 1, the left, front, right, roof, and rear panels latched together to form the camper using spring loaded toggle latches.

8. The camper of claim 1, the rear panel including an entryway opening.

9. A camper sized to fit atop a periphery of a pickup truck bed, the camper comprising:
a left side panel formed of one or more substantially planar panels together sized to extend along a left side of the pickup truck bed and having a length not longer than a longitudinal length of the pickup truck bed;
a right side panel formed of one or more substantially planar panels together sized to extend along a right side of the pickup truck bed and having a length not longer than the longitudinal length of the pickup truck bed;
a roof panel formed of one or more substantially planar panels together sized to extend between the left and right side panels and between the front and rear panels and having a length not longer than the longitudinal length of the pickup truck bed;
a front panel formed of one or more substantially planar panels together sized to extend across a front side of the pickup truck bed and between the left side panel and the right side panel;
a rear panel formed of one or more substantially planar panels together sized to extend across the rear of the pickup truck bed between the left side panel and the right side panel;
at least one opening to admit one of light and air;
at least the left and right panels each including a watertight mechanical seam releasably formable between each of the front and rear panels, the mechanical seam not causing the left, right, front, or back panels not to be substantially planar when the mechanical seam is not formed;

whereby the left, right, front, back, and roof panels are stackable one flat atop the other and stowable within the pickup truck bed when the mechanical seam is not formed;

wherein the front panel is articulated by a living hinge.

10. The camper of claim 9, each of the left, front, right, roof, and rear panels formed using one of fiberglass, glass reinforced plastic, and carbon fiber.

11. The camper of claim 9, at least one of the left, front, right, roof, and rear panels formed using a frame over which a material is fastened.

12. The camper of claim 9, the left, front, right, roof, and rear panels latched together to form the camper using spring loaded toggle latches.

13. The camper of claim 9, the rear panel including an entryway opening.

14. A camper sized to fit atop a periphery of a pickup truck bed, the camper comprising:
  a left side panel formed of one or more substantially planar panels together sized to extend along a left side of the pickup truck bed and having a length not longer than a longitudinal length of the pickup truck bed;
  a right side panel formed of one or more substantially planar panels together sized to extend along a right side of the pickup truck bed and having a length not longer than the longitudinal length of the pickup truck bed;
  a roof panel formed of one or more substantially planar panels together sized to extend between the left and right side panels and between the front and rear panels and having a length not longer than the longitudinal length of the pickup truck bed;
  a front panel formed of one or more substantially planar panels together sized to extend across a front side of the pickup truck bed and between the left side panel and the right side panel;
  a rear panel formed of one or more substantially planar panels together sized to extend across the rear of the pickup truck bed between the left side panel and the right side panel;
  at least one opening to admit one of light and air;
  at least the left and right panels each including a water-tight mechanical seam releasably formable between each of the front and rear panels, the mechanical seam not causing the left, right, front, or back panels not to be substantially planar when the mechanical seam is not formed;
  a plurality of connectors, at least one of the plurality of connectors connectable between the left panel and the front panel, at least one of the plurality of connectors connectable between the left panel and the rear panel, at least one of the plurality of connectors connectable between the right panel and the front panel, and at least one of the plurality of connectors connectable between the right panel and the rear panel, to latch the left panel to the front and back panels, and to latch the right panel to the front and back panels;
  whereby the left, right, front, back, and roof panels are stackable one flat atop the other and stowable within the pickup truck bed when the mechanical seam is not formed;
  wherein each of the plurality of connectors is formed by one of a bar or post affixed to one connectable panel and clip or loop affixed to the other connectable panel, respectively.

15. The camper of claim 14, each of the left, front, right, roof, and rear panels formed using one of fiberglass, glass reinforced plastic, and carbon fiber.

16. The camper of claim 14, at least one of the left, front, right, roof, and rear panels formed using a frame over which a material is fastened.

17. The camper of claim 14, the left, front, right, roof, and rear panels latched together to form the camper using spring loaded toggle latches.

18. The camper of claim 14, the rear panel including an entryway opening.

* * * * *